United States Patent
Zametzky

(10) Patent No.: US 8,026,684 B2
(45) Date of Patent: Sep. 27, 2011

(54) ELECTRONIC CONTROL SYSTEM

(75) Inventor: Klaus Zametzky, Schwabach (DE)

(73) Assignee: Sitronic Ges. fuer Elektrotechnische Ausruestung mbH & Co KG, Gartringen (DE)

( * ) Notice: Subject to any disclaimer, the term of this patent is extended or adjusted under 35 U.S.C. 154(b) by 524 days.

(21) Appl. No.: 12/291,679

(22) Filed: Nov. 12, 2008

(65) Prior Publication Data

US 2009/0121667 A1    May 14, 2009

(30) Foreign Application Priority Data

Nov. 14, 2007    (DE) .................. 10 2007 054 191

(51) Int. Cl.
*H02P 7/06* (2006.01)
(52) U.S. Cl. ............ 318/434; 318/139; 318/400.26; 363/60; 363/98; 363/132
(58) Field of Classification Search .......... 318/434, 318/400.26, 139; 363/98, 132, 60
See application file for complete search history.

(56) References Cited

U.S. PATENT DOCUMENTS

| 4,926,354 A | 5/1990 | Pattantyus |
| 5,459,654 A * | 10/1995 | Williams et al. ............ 363/98 |
| 6,185,118 B1 * | 2/2001 | Sander et al. ............ 363/132 |

FOREIGN PATENT DOCUMENTS

| DE | 69001520 T2 | 8/1993 |
| DE | 10 2004 042 731 A1 | 3/2006 |
| EP | 1 239 430 A1 | 11/2002 |
| WO | WO 2007/095898 A1 | 8/2007 |
| WO | WO 2007/112713 A2 | 10/2007 |

* cited by examiner

*Primary Examiner* — Walter Benson
*Assistant Examiner* — David Luo
(74) *Attorney, Agent, or Firm* — Walter A. Hackler

(57) ABSTRACT

The invention relates to an electronic control system for controlling a voltage across a load, in particular across a fan motor of a motor vehicle, as a function of a control signal, comprising: a setting transistor, a transistor, which activates the control channel of the setting transistor, as well as two resistors, which form a voltage divider via which the voltage across the load is fed to the emitter of the transistor, wherein the control system is designed, in the absence of the control signal, to block the control channels of all the transistors of the control system for limiting the current through all the resistors of the control system, such that, in the absence of the control signal, the control system has a quiescent current consumption in the off-state current range of the transistors.

17 Claims, 5 Drawing Sheets

ELECTRONIC CONTROL SYSTEM

The invention relates to an electronic control system for controlling a voltage across a load, in particular across a fan motor of a motor vehicle, as a function of a control signal.

In the case of such a control system, the voltage at the normally high-side load is intended to be controlled by a control signal supplied from outside. If no control signal is applied, the control system is intended to remain in what is called a quiescent, or low, state and consume as little current as possible.

A circuit diagram of such a control system 1, in the form of a linear control circuit for a fan motor of a motor vehicle fan, is shown in FIG. 1. The control system 1 is connected to a vehicle battery as the voltage source V2, which delivers a supply voltage for supplying the control system 1. A voltage Umot to be controlled is dropped across the load Rm, which in this particular case is formed by a fan motor. A power transistor (MOS-FET) is used as setting transistor M1 for the control system 1. At the control input of the setting transistor M1 there is arranged a differential amplifier U1A, between the inputs of which a system deviation is present as the difference between the signals U+, U− at the inverting and non-inverting input respectively.

To simplify the description of the Figures in the text that follows, as far as the reference signs are concerned no distinction is made between the electronic components shown and the operands associated therewith. So, for example, the reference sign V2 stands for a voltage source as a component and equally for the voltage V2 generated by it.

In the case of the control system 1, a voltage source V1 delivers a desired value in the form of a control voltage V1. When V1=0 V, a first transistor Q1 and a second transistor Q2 of the control system 1 are blocked, i.e. the circuit arrangement as a whole is in a quiescent state and in particular also the differential amplifier U1A ceases to be supplied with a supply voltage. In this state, the current I3 through the second transistor Q2 is therefore in the negligibly small off-state current range. Only the current I1 through a first and second resistor R1, R2, and the current I2 though a third and fourth resistor R3, R4 are still loading the battery, i.e. the voltage source V2, since the off-state current of the setting transistor M1 is likewise negligibly small. If, as mentioned initially, a small quiescent current consumption is required, the four resistors R1 to R4 must be designed as high-impedance resistors, which renders the circuit function susceptible to leakage currents and may necessitate expensive coating of the printed circuit board.

If the desired value of the control voltage V1 rises to such a high level that the first transistor Q1 switches on, the operational amplifier U1A is supplied with voltage, and the circuit "awakes" from the quiescent state. The operational amplifier U1A adjusts its output voltage, and hence the gate-source voltage of the setting transistor M1, in such a way that the signal U+ at the non-inverting input becomes approximately the same as the signal U− at the inverting input. The arrangement can be described by the following equations; the influence of four further resistors R5 to R8 arranged in the circuit can be disregarded:

$$U_+ = U_- \tag{1}$$

$$U_- = V_2 \cdot \frac{R_3}{R_3 + R_4} \tag{2}$$

$$U_+ = V_1 + I_2 \cdot R_1 \tag{3}$$

$$I_2 = (V_2 - U_{mot} - V_1) \cdot \frac{1}{R_1 + R_2} \tag{4}$$

Inserting equation (4) in equation (3), the use of equation (1) and (2) and the substitution $$\frac{R_1}{R_1 + R_2} = a; \frac{R_3}{R_3 + R_4} = b$$

results in:

$$U_+ = V_1 + (V_2 - U_{mot} - V_1) \cdot \frac{1}{R_1 + R_2} \tag{5}$$

$$V_2 \cdot \frac{R_3}{R_3 + R_4} = V_1 + (V_2 - U_{mot} - V_1) \cdot \frac{R_1}{R_1 + R_2} \tag{6}$$

$$bV_2 = V_1 + aV_2 - aU_{mot} - aV_1 \tag{7}$$

An important requirement of a fan control unit of a motor vehicle is to smooth out on-board voltage fluctuations, i.e. the voltage Umot of the load Rm should be independent of the supply voltage V2. V2 disappears in equation (7) and equation (6) only when a=b and R1/R2=R3/R4 respectively. The response of the control system 1 upon occurrence of on-board voltage fluctuations dV2 is thus dependent on the pairing tolerance of the voltage dividers R1/R2 and R3/R4. It follows that:

$$aU_{mot} = V_l - aV_l \tag{8}$$

$$U_{mot} = V_1\left(\frac{1}{a} - 1\right) \tag{9}$$

$$U_{mot} = V_1\left(\frac{R_1 + R_2}{R_1} - 1\right) = V_1 \cdot \frac{R_2}{R_1} \tag{10}$$

The correlation Umot=f(V1), assuming ideal components and ideal pairing tolerance of R1/R2=R3/R4, is determined only by the resistance ratio of R1/R2. The voltage Umot across the load Rm is thus largely independent of the supply voltage V2; the operational amplifier U1A smoothes out onboard voltage fluctuations.

If, for reasons of cost, it is desired to dispense with an encapsulation of the regulator electronics, then the use of high-impedance resistors is problematic. Condensation and the associated contaminations occurring in the vehicle on the circuit board surface lead to leakage currents, which affect the function of switching circuits designed with high impedance. The four resistors R1 to R4 cannot therefore be made with arbitrarily high impedance, so that the currents I1 and I2 respectively flowing through them put load on the battery in standby operation. This is particularly problematic because the number of electronic devices that are fed from a motor vehicle battery is always increasing.

The invention addresses the problem of providing an inexpensive control system that has an unusually low current consumption in the quiescent state.

SUMMARY OF THE INVENTION

That problem is solved by a control system of the kind mentioned in the introduction, which comprises: a setting transistor, a transistor that activates the control channel of the setting transistor, as well as two resistors that form a voltage divider, via which the voltage across the load is fed to the emitter of the transistor, wherein the control system is designed, in the absence of the control signal, to block the control channels of (all) the transistors of the control system for limiting the current through (all) the resistors of the control system, such that, in the absence of the control signal, the control system has a quiescent current consumption in the off-state current range of the transistors.

With the control system according to the invention, the current consumption in the quiescent state compared with the control systems known from the prior art can be reduced, which results in a low current flow of typically less than 100 nA, i.e. a clear reduction compared with conventional circuits, in which the quiescent current consumption is typically approximately 100 µA or more.

This result is achieved in that the voltage supply of the resistors is effected via the transistors which are blocked in the absence of the control signal. The resistors of the control system may be arranged in the collector circuits or the emitter circuits of the transistors, such that, in the absence of the control signal, the resistors are no longer fed by the collector current and the emitter current, respectively. Moreover, when using e.g. a pulse-width modulated signal as a control signal, it is also possible to arrange the resistors in the control channels of the transistors, as, in the absence of the pulse-width modulated signal (corresponding to an open switch), the resistors in the control channel are also not fed with a current. In any case, in contrast to the control system shown in FIG. 1, in the control system according to the invention, no closed current path which loads the battery is present in the quiescent state.

In the case of an advantageous embodiment, the two resistors each amount to not more than 10 kΩ, preferably not more than 2 kΩ. By virtue of this comparatively low impedance design, it is possible to achieve a low susceptibility to leakage currents.

In the case of an advantageous embodiment, the control system is designed to generate a voltage across the load proportional to the control signal, the proportionality factor being dependent on the ratio of the two resistors. The proportionality factor can therefore be adjusted during the regulation using the ratio of the resistors. It shall be understood that in the case of control signals that are not voltage signals, the proportionality exists between a voltage derived from the control signal and the load voltage.

In a preferred embodiment the emitter-base voltage of a further transistor compensates for the influence of the emitter-base voltage of the transistor on the voltage across the load. In such a way, the voltage across the load is made independent from the emitter-base voltages of the transistor(s).

In the case of an especially advantageous development, the further transistor, together with the transistor, forms a base-coupled differential amplifier, the transistors of the differential amplifier preferably forming a double transistor. For the purposes of this application, a double transistor shall be understood to be a component in which the two transistors are of the same conductivity type and also parameter-matched, and are thermally coupled. In the case of a double transistor, the base-emitter voltages of the two transistors can be regarded as being of approximately equal magnitude, even if the transistors are subjected to fluctuations in temperature, so that the influence of the base-emitter voltage of the one transistor on the voltage dropping across the load can be compensated by the base-emitter voltage of the further transistor.

In the case of an advantageous embodiment, the control signal is a control voltage, and two additional transistors are provided, wherein the control voltage is fed to the control channel of the first additional transistor, and wherein the second additional transistor, together with the further transistor of the differential amplifier, is arranged in the collector circuit of the first additional transistor. In such an arrangement of the additional transistors, switching off the quiescent current can be implemented in an especially simple manner.

In the case of a preferred refinement, a first resistor in the emitter circuit of the first additional transistor and a second resistor in the collector circuit of the first additional transistor are arranged in series with the second additional transistor, the first and second resistors preferably being of the same size. If the two resistors in the above arrangement are selected to be of the same size, the influence of the base-emitter voltage of the first additional transistor on the voltage through the load can be exactly compensated by the base-emitter voltage of the second additional transistor.

In the case of an advantageous alternative embodiment, the control signal is a control current and two additional transistors are provided, which form a current mirror for transfer of the control current to the further transistor. The two additional transistors can be operated in common emitter circuit, the resistors arranged in the respective emitter circuits preferably being selected to be of the same size. The result of this is that the emitter currents become equal in magnitude, so that should the additional transistors likewise be in the form of double transistors, compliance with the condition of identical base-emitter voltages is especially good.

In the case of an especially preferred refinement, the two additional transistors form a double transistor. As described above, the influence of the base-emitter voltage of the first of the two additional transistors on the load voltage can in this case be compensated by means of the second additional transistor.

In another preferred embodiment, the control signal is a pulse width-modulated signal and the control system comprises a PWM/DC converter for converting the pulse width-modulated signal into a direct voltage. A pulse width-modulated signal is often used as a control signal, since in this case a variation in the earth potentials between the device that generates the control signal and the control system does not have an adverse effect on the regulation.

In the case of an especially advantageous refinement, the PWM/DC converter comprises a further transistor, which preferably forms a double transistor with the transistor, the emitter-base voltage of the further transistor exactly compensating for the influence of the emitter-base voltage of the transistor on the voltage across the load at exactly one pulse duty cycle. The pulse duty cycle of the pulse-width modulated, periodic signal is defined by the ratio between ON-time and total period of the signal. It shall be understood that the control system is preferably operated with exactly the pulse duty cycle at which the ideal compensation is effected. Normally, however, the pulse duty cycle will vary, this variation occurring preferably in a range around the ideal pulse duty cycle.

In the case of a further advantageous refinement, a base-emitter resistor is arranged parallel to the base-emitter path of the further transistor and a collector-base resistor is arranged parallel to the collector-base path of the further transistor, the exactly one pulse duty cycle being adjustable by way of the ratio of the resistors. Through the resistor ratio, the pulse duty cycle at which compensation occurs, may, depending on the design of the circuit, optionally be adjusted as desired over the entire range between zero and one possible for the pulse duty cycle. It is understood that the ideal pulse duty cycle can also be made adjustable if need be by replacing the two resistors with one adjustable resistor.

In the case of an advantageous embodiment, the control system furthermore comprises a subordinate circuit part, in particular a current limiter, which is arranged in the collector circuit of the transistor and which is fed by the collector current thereof. The voltage supply of the subordinate circuit part is effected in this case via the transistor, thus ensuring that in the quiescent state of the control system, the transistor likewise consumes no quiescent current.

In the case of an advantageous refinement, the subordinate circuit part is arranged parallel to the gate-source control path of the setting transistor in the form of a MOS-FET. In that case, the subordinate circuit part may serve as a current limiter, which ensures that the gate voltage of the setting transistor does not exceed a pre-settable maximum value.

The control system is especially preferably constructed from discrete components. Such a control system is robust and can therefore also be operated a high temperatures of up to 150° C. and be produced with comparatively few components.

Another aspect of the invention is embodied in a motor vehicle fan having a control system as described above, in which a fan motor constitutes the load. Such a vehicle fan consumes only a very low quiescent current in the quiescent state and can therefore contribute to non-discharge of the vehicle battery even when the vehicle is immobile for relatively long periods of time.

BRIEF DESCRIPTION OF THE DRAWINGS

Exemplary embodiments of the control system according to the invention are illustrated in the schematic drawings, and are explained in the following description. In the drawings.

DETAILED DESCRIPTION

Figure 1:
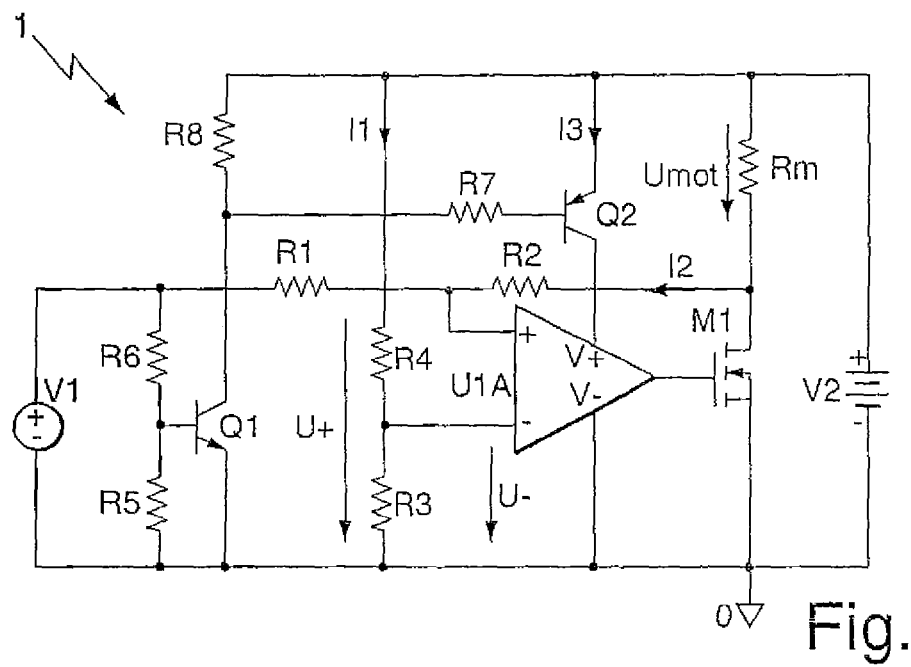
FIG. 1 is a circuit diagram of a control system with quiescent current switch-off function according to the prior art.
Figure 2:
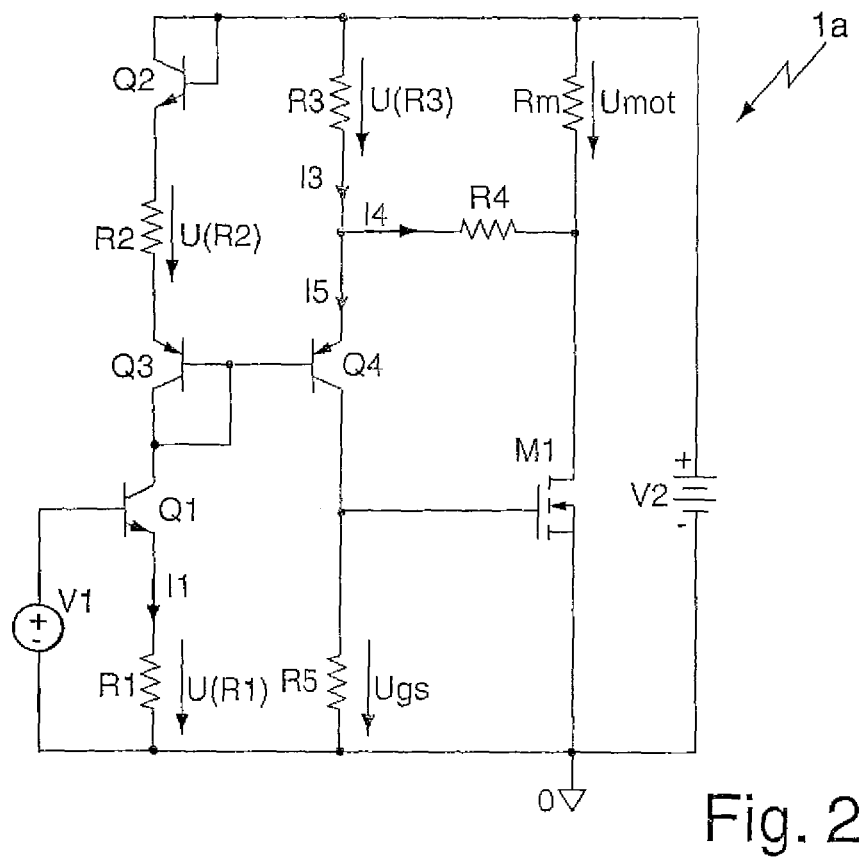
FIG. 2 is a circuit diagram of an embodiment of a control system according to the invention with a control voltage as the control signal, FIGS. 3a, b are circuit diagrams of an embodiment of the control system according to the invention with a control current as the control signal.

FIG. 2 shows a control system 1a, which, like the control system 1 shown in FIG. 1, is used to control a voltage Umot across a fan motor as the load Rm and which is integrated in a motor vehicle fan (not shown). The vehicle battery, which itself is not part of the control system 1, provides a supply voltage V2 for this. A MOS-FET as the setting transistor M1 is used to adjust the current and hence the voltage Umot through the load Rm. The control channel (gate) of the setting transistor M1 is activated by a transistor Q4. The voltage Umot across the load Rm is supplied to the emitter of the transistor Q4 via a third and fourth resistor R3, R4, which form a voltage divider. The transistor Q4 is base-coupled to a further transistor Q3, the base-collector path of which is bridged, and forms with this a differential amplifier. A control voltage V1, which is supplied to the base of a first additional transistor Q1, is used as the control signal, as in FIG. 1. A second additional transistor Q2, the base-collector path of which is likewise bridged, is arranged jointly with the further transistor Q3 of the differential amplifier in the collector circuit of the first additional transistor Q1.

Furthermore, a first resistor R1 in the emitter circuit of the first additional transistor Q1 and a second resistor R2 in the collector circuit of the first additional transistor Q1 are arranged in series with the second additional transistor Q2. A fifth resistor R5 is arranged parallel to the gate-source control path of the setting transistor M1.

As the control voltage V1 disappears to become V1=0 V, the first further transistor Q1 is blocked and the entire arrangement becomes currentless, i.e. is in a quiescent state. Even when all resistors R1 to R5 are of low-impedance dimensions, the current consumption of the entire control system 1 is in the negligibly small off-state current range of typically less than about 100 nA. If the control voltage V1 increases to such a high level that the first transistor Q1 becomes conductive, the circuit awakes from its quiescent state and can be described by the following equations (disregarding the base currents):

$$I1 = \frac{V1 - U_{BE}(Q1)}{R1} \quad (11)$$

$$U(R2) = I1 \cdot R2 \quad (12)$$

$$U(R3) + U_{EB}(Q4) == U_{BE}(Q2) + U(R2) + U_{EB}(Q3) \quad (13)$$

$$I3 = I4 + I5 \quad (14)$$

From equation (14) it follows that:

$$\frac{U(R3)}{R3} = \frac{Umot - U(R3)}{R4} + \frac{Ugs}{R5} \quad (15)$$

$$Umot = \left(\frac{R4}{R3} + 1\right) \cdot U(R3) - \frac{R4}{R5} \cdot Ugs$$

If thermally coupled transistors with paired properties (double transistors) are used for the further transistors Q1 and Q2 and for the transistors Q3 and Q4 of the differential amplifier, then as a good approximation: $U_{BE}(Q1)=U_{BE}(Q2)$ and $U_{BE}(Q3)=U_{BE}(Q4)$. By inserting equation (13) in equation (15) and by using equations (11) and (12) it follows that:

$$Umot = \left(\frac{R4}{R3} + 1\right) \cdot [U_{BE}(Q2) + U(R2)] - \frac{R4}{R5} \cdot Ugs \quad (16)$$

$$Umot = \left(\frac{R4}{R3} + 1\right) \cdot [U_{BE}(Q2) + I1 \cdot R2] - \frac{R4}{R5} \cdot Ugs \quad (17)$$

$$Umot = \left(\frac{R4}{R3} + 1\right) \cdot \left[U_{BE}(Q2) + \frac{V1 - U_{BE}(Q1)}{R1} \cdot R2\right] - \frac{R4}{R5} \cdot Ugs \quad (18)$$

According to the above equations, Umot is always independent of the supply voltage V2. Although in practice owing to the Early effect, which is disregarded in equations (1) to (4), there is nevertheless a very low dependency on the supply voltage V2, the role of this for fan control circuits is negligible. In particular, in contrast to the prior art, to generate a voltage Umot across the load Rm that is independent of the supply voltage V2, it is not necessary for two resistor ratios to assume a certain value, so that the above result is independent of resistor pairing tolerances.

The result found in equation (18) can be yet further simplified if the magnitudes of the first and second resistors R1, R2 are selected to be the same (R1=R2) and the equality of the base-emitter voltages of the further transistors Q1 and Q2 is taken into consideration:

$$Umot = \left(\frac{R4}{R3} + 1\right) \cdot V1 - \frac{R4}{R5} \cdot Ugs \qquad (19)$$

If furthermore the fifth resistor R5 is considerably larger than the fourth resistor R4 (R5>>R4), then the correlation between the voltage Umot across the load Rm and the control voltage V1 is determined as a good approximation only by the ratio R4/R3:

$$Umot \approx \left(\frac{R4}{R3} + 1\right) \cdot V1 \qquad (20)$$

The control system shown in FIG. 2 can thus generate a voltage Umot across the load Rm that is proportional to the control voltage V1, the proportionality factor being adjustable through the ratio of the third and fourth resistors R3, R4.

Figure 3A:
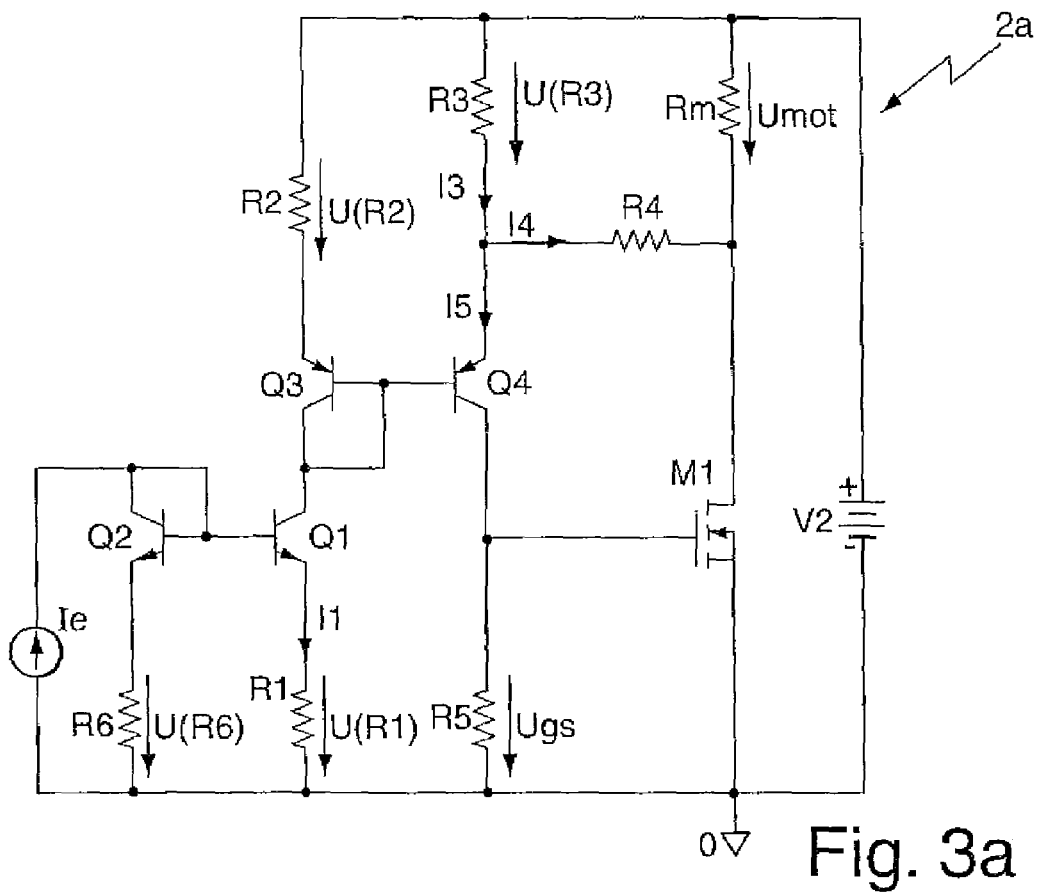

If a current Ie is selected as the control signal, then the use of a control system 2a as shown in FIG. 3a is advantageous. The control system of FIG. 3a differs from the control system 1a of FIG. 2 essentially in that the second additional transistor Q2 is no longer arranged in the collector circuit of the first additional transistor Q1 but is base-coupled with this. Furthermore, a sixth resistor R6 is arranged in the emitter circuit of the second additional transistor Q2. The two additional transistors Q1, Q2 form a current mirror for transfer of the control current Ie to the further transistor Q3.

With a control current Ie=0 mA, the first additional transistor Q1 is blocked and the entire arrangement is in the currentless quiescent state. Here, as in the case of the control system 1a of FIG. 2, the current consumption of the entire arrangement is in the negligibly small off-state current range, even if all resistors R1 to R6 are of low-impedance dimensions.

With a control current Ie>0, the first additional transistor Q1 becomes conductive, the circuit "awakens" from the quiescent state and can (disregarding the base currents) be described by the following equations:

$$I1 = \frac{Ie \cdot R6 + U_{BE}(Q2) - U_{BE}(Q1)}{R1} \qquad (21)$$

$$U(R2) = I1 \cdot R2 \qquad (22)$$

$$U(R3) + U_{BE}(Q4) = U(R2) + U_{EB}(Q3) \qquad (23)$$

$$I3 = I4 + I5 \qquad (24)$$

Owing to the similarity between the circuit diagrams of the control system 1a of FIG. 2 and the control system 2a of FIG. 3a, equation (15) is valid also in the present case:

$$Umot = \left(\frac{R4}{R3} + 1\right) \cdot U(R3) \frac{R4}{R5} \cdot Ugs \qquad (15)$$

Let it also be assumed in the present case that double transistors with paired properties are used for the two additional transistors Q1 and Q2 and for the two transistors Q3 and Q4 of the differential amplifier, so that $U_{BE}(Q1)=U_{BE}(Q2)$ and $U_{BE}(Q3)=U_{BE}(Q4)$, and by inserting equation (23) in equation (15) and also by using equation (22) and (21) it follows that:

$$Umot = \left(\frac{R4}{R3} + 1\right) \cdot U(R2) - \frac{R4}{R5} \cdot Ugs \qquad (25)$$

$$Umot = \left(\frac{R4}{R3} + 1\right) \cdot I1 \cdot R2 - \frac{R4}{R5} \cdot Ugs \qquad (26)$$

$$Umot = \left(\frac{R4}{R3} + 1\right) \cdot Ie \cdot \frac{R6 \cdot R2}{R1} - \frac{R4}{R5} \cdot Ugs \qquad (27)$$

The condition $U_{BE}(Q1)=U_{BE}(Q2)$ is especially exactly observed for paired transistors when the emitter currents thereof are of the same magnitude. The resistor R1 in the emitter circuit of the first additional transistor Q1 is therefore preferably the same size as the resistor R6 in the emitter circuit of the second additional transistor Q2, so that for the voltage Umot across the load Rm it follows that:

$$Umot = \left(\frac{R4}{R3} + 1\right) \cdot Ie \cdot R2 - \frac{R4}{R5} \cdot Ugs \qquad (28)$$

If, as described in connection with FIG. 2, the fifth resistor R5 is selected to be considerably larger than the fourth resistor R4 (R5>>R4), then the correlation between the load voltage Umot and the control current Ie is determined as a good approximation only by the second to fourth resistor R2, R3, R4:

$$Umot \approx \left(\frac{R4}{R3} + 1\right) \cdot Ie \cdot R2 \qquad (29)$$

In this case too, the voltage Umot across the load Rm is therefore proportional to the control signal, i.e. to the control current Ie. The proportionality factor can in this connection be adjusted by the ratio between the third and fourth resistor R3, R4.

Figure 3B:
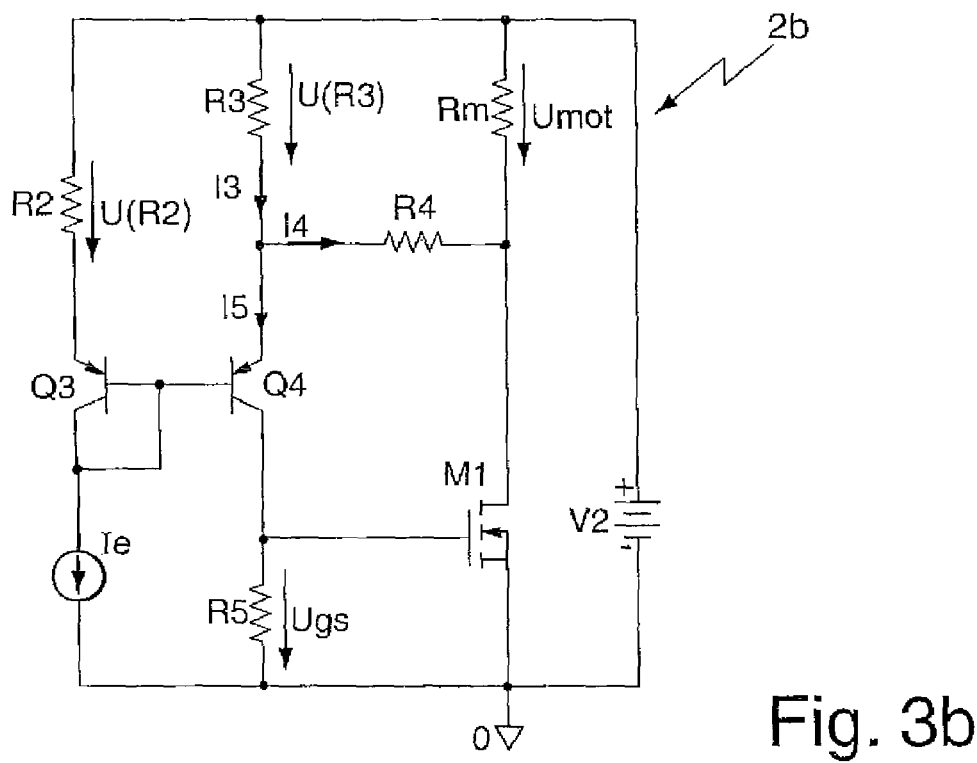

A further control system 2b for the control current Ie as the control signal is shown in FIG. 3b. The control system 2b differs from the control system 2a of FIG. 3a in that the control current is of opposite polarity. In that case, the two further transistors Q1, Q2 and the first and sixth resistor R1, R6 can be omitted. Also in this case, provided that the fifth resistor R5 is selected to be considerably larger than the fourth resistor R4 (R5>>R4), the relation specified in equation (29) for the voltage Umot across the load Rm arises. If in the case of the two control systems 2a, 2b the second resistor R2 is selected to be the same as the third resistor R3, the proportionality factor between voltage Umot and control current Ie is dependent only on the sum of the third and fourth resistors R3, R4.

If a pulse width-modulated switching signal is selected as the control signal, then the use of control systems 3a to 3d is advantageous, these systems being described in the following by means of FIGS. 4a to 4d.

Figure 4A:
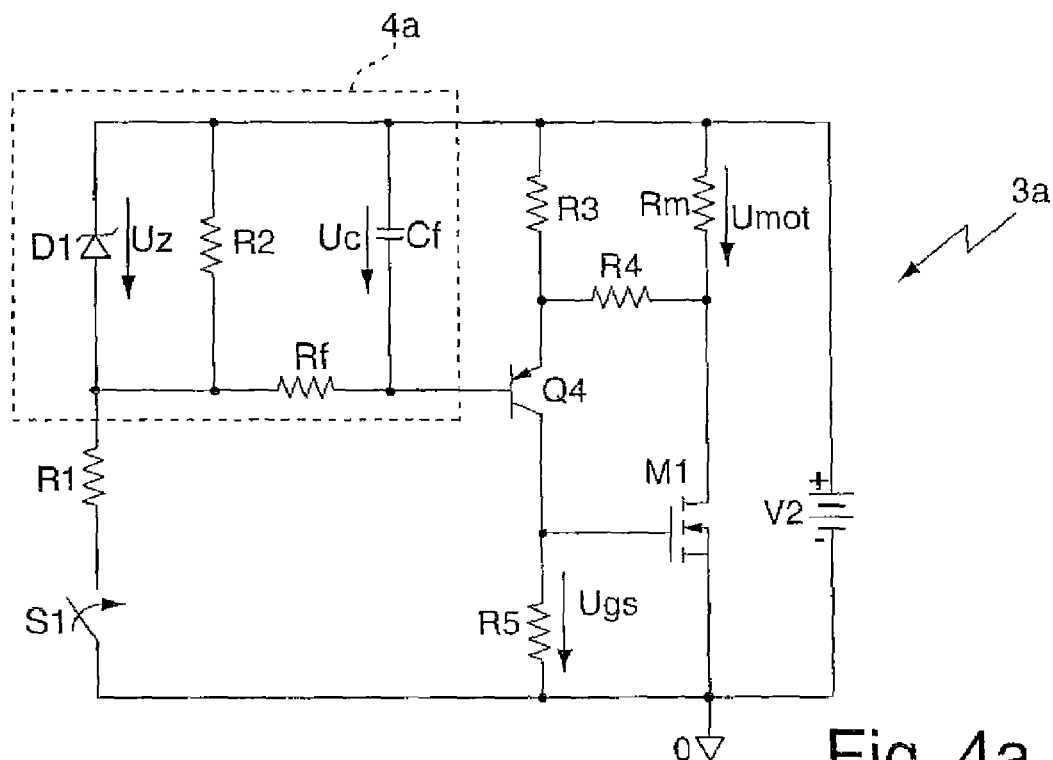
FIGS. 4a-d are circuit diagrams of embodiments of the control system according to the invention with a pulse width-modulated signal as the control signal.

In the case of the control system 3a shown in FIG. 4a, the switching signal S1 is generated by a switch S1, which switches on and off periodically. The switch S1 can be embodied, for example, by a transistor in an open collector circuit, which does not form part of the control system 3a but is normally connected by way of a line to the control system 3a.

The control signal S1 is formed by the ratio between ON and OFF times of the switch S1, with the definition:
Control signal level=pulse duty cycle (TV) where $$TV = \frac{t_{on}}{t_{on} + t_{off}} = \frac{t_{on}}{T}$$

An arrangement of a Zener diode D1, a second resistor R2, and also a low pass filter, comprising a resistor Rf and a capacitor Cf, forms a PWM/DC converter 4a, which converts the control signal S1 with pulse duty cycle TV into a direct voltage Uc across the capacitor Cf. If the resistor Rf of the low pass filter is selected to be considerably larger than the second resistor R2 (Rf>>R2) and if in addition the product of capacitor Cf and resistor Rf is selected to be considerably larger than the period T of the pulse width-modulated control signal S1 (Cf*Rf>>T), then as a good approximation it is true that:

$$Uc \approx TV \cdot Uz$$

and for the voltage Umot across the load Rm (R5>>R4) it follows from equation (15) that:

$$Umot \approx \left(\frac{R4}{R3} + 1\right) \cdot (U_C - U_{EB}(Q4)) \quad (30)$$

and $$Umot \approx \left(\frac{R4}{R3}\right) + 1 \cdot (TV \cdot U_Z - U_{EB}(Q4)) \quad (31)$$

Figure 4B:
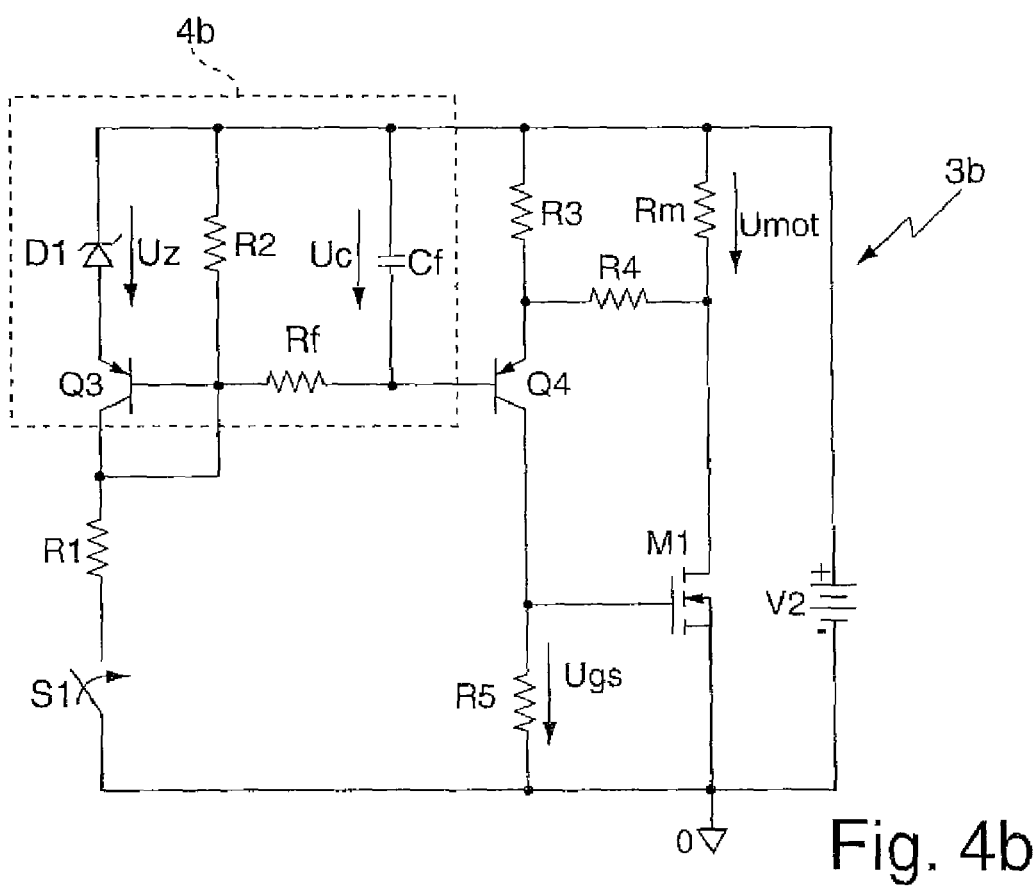

The influence of the emitter-base voltage $U_{EB}(Q4)$ of the transistor Q4 on the load voltage Umot may, as shown in FIG. 4b by means of a control system 3b, be eliminated by use of a further transistor Q3 in a PWM/DC converter 4b for a specific pulse duty cycle (where R5>>R4):

$$Umot \approx \left(\frac{R4}{R3} + 1\right) \cdot \{TV \cdot [U_Z + U_{EB}(Q3)] - U_{EB}(Q4)\} \quad (32)$$

In particular when a double transistor with paired parameters and with thermal coupling is used for the transistor Q4 and the further transistor Q3, $U_{EB}(Q3)=E_{EB}(Q4)$ is true, and hence for TV=1:

$$Umot \approx \left(\frac{R4}{R3} + 1\right) \cdot U_Z \quad (33)$$

Figure 4C:
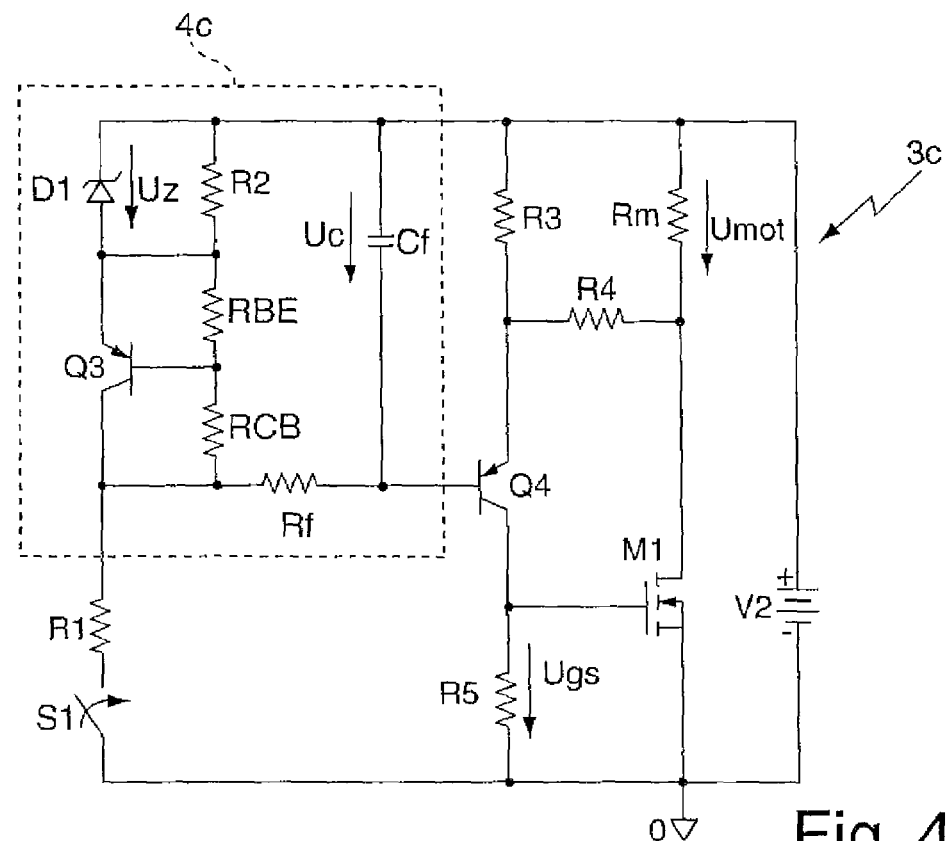

The control system 3b shown in FIG. 4b therefore operates approximately exactly at large pulse duty cycles TV close to TV=1. Should an exact compensation of the influence of the base-emitter voltage $U_{EB}(Q4)$ on the load voltage Umot be effected at an arbitrary pulse duty cycle, then it is advantageous to use a control system 3c, as shown in FIG. 4c, which comprises a PWM/DC converter 4c, in which case a base-emitter resistor RBE is arranged parallel to the base-emitter path of the further transistor Q3 and a collector-base resistor RCB is arranged parallel to the collector-base path of the further transistor Q3.

With such a circuit arrangement, then for the load voltage Umot (with R5>>R4) it follows that:

$$U_{mot} \approx \left(\frac{R4+1}{R3}\right) \cdot \left\{\left\{TV \cdot \left[U_Z + U_{EB}(Q3) \cdot \left(\frac{R_{CB}}{R_{BE}} + 1\right)\right] - U_{EB}(Q4)\right\}\right\} \quad (34)$$

When using a double transistor, the emitter-base voltages of the two transistors Q3, Q4 are of the same magnitude. If in this case $$\frac{R_{CB}}{R_{BE}} + 1 = \frac{1}{TV}$$

is selected for the prefactor, then it follows that:

$$Umot \approx \left(\frac{R4}{R3} + 1\right) \cdot U_Z \cdot TV \quad (35)$$

When matching the resistor ratio RCB/RBE to an arbitrarily selectable pulse duty cycle TV, the control system 3c therefore operates exactly, the control system still allowing good properties with high accuracy also in a range around this pulse duty cycle. Specifically, for example, a control system that is intended to achieve good results in a range of pulse duty cycles between TV=0.3 and 0.7 may be required. In that case, $R_{CB}=R_{BE}$ can be selected, so that the control system 3c operates exactly at a pulse duty cycle TV=0.5. The entire control system 3c inclusive of the PWM/DC converter 4c consists only of a double transistor (Q3, Q4), the Zener diode D1, the capacitor Cf and a small number of resistors.

The basic concept of the control systems 3a to 3c consists in compensating for the influence of the transistor Q4 by the further transistor Q3, which is part of the PWM/DC converter 4a to 4c. If the further transistor Q3 (on the basis of a classic differential amplifier stage) is regarded as part of the voltage regulator, then the PWM/DC converter is embedded in the voltage regulator; it is thus a matter of a voltage regulator with an integral PWM/DC converter.

Figure 4D:
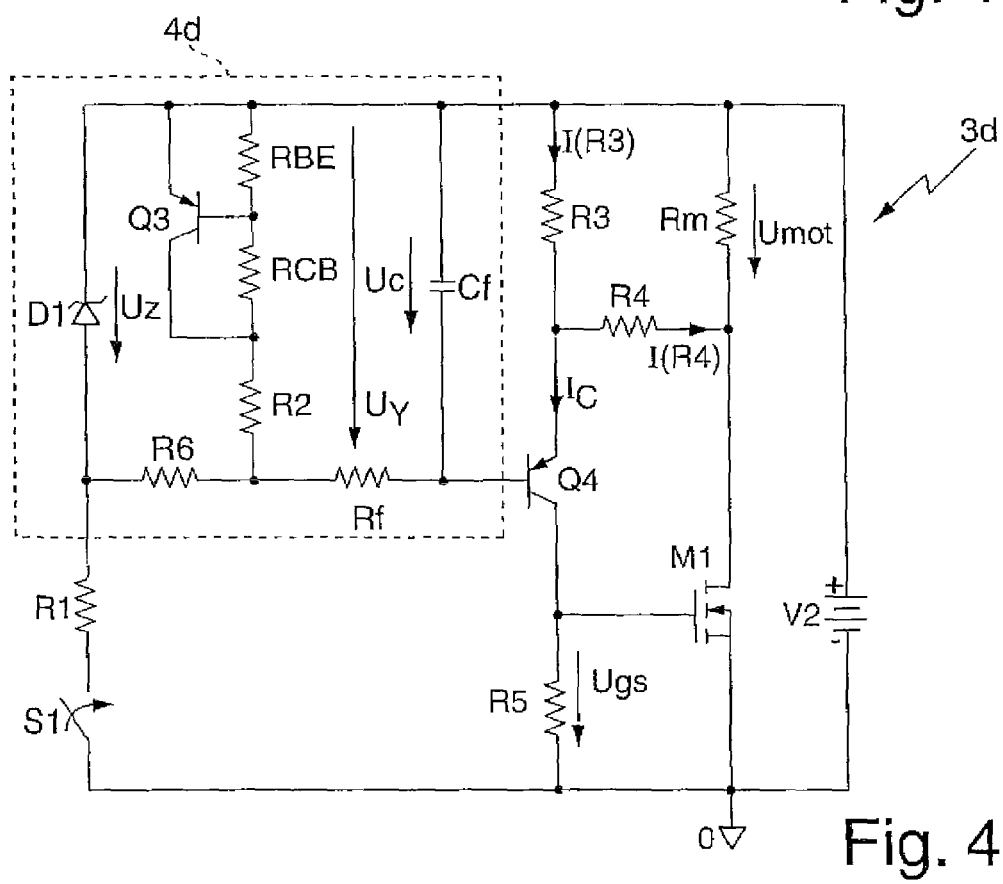

In addition to the circuits shown by way of example in FIGS. 4a to 4c, further options exist for constructing a voltage regulator with an integral PWM/DC converter, of which one is shown in FIG. 4d for a control system 3d; this system comprises a PWM/DC converter 4d in which the Zener diode D1 is arranged parallel to the further transistor Q3 and in which a sixth resistor R6 is provided. The control system 3d shown in FIG. 4d can be described by the following equations:

$$I(R3) = I(R4) + I_C(Q4) \quad (36)$$

$$\frac{U(R3)}{R3} = \frac{U(R4)}{R4} + \frac{Ugs}{R5} \quad (37)$$

$$\frac{Uc - U_{EB}(Q4)}{R3} = \frac{Umot - U(R3)}{R4} + \frac{Ugs}{R5} \quad (38)$$

$$\frac{Uc - U_{EB}(Q4)}{R3} = \frac{Umot - Uc + U_{EB}(Q4)}{R4} + \frac{Ugs}{R5} \quad (39)$$

Solving the equation for the load voltage Umot gives:

$$Umot = Uc \cdot \left(\frac{R4}{R3} + 1\right) - U_{EB}(Q4) \cdot \left(\frac{R4}{R3} + 1\right) - Ugs \cdot \frac{R4}{R5} \quad (40)$$

Assuming in the following that the resistor Rf of the low pass filter is considerably larger than the sum of the base-emitter resistor RBE, the collector-base resistor RCB and the second resistor R2 (Rf>>R2+RBE+RCB), then for the voltage Uy that drops across these three resistors it is true that:

$$Uy = U(R2) + U_{CE}(Q3) \quad (41)$$

$$Uy = R2 \cdot \frac{Uz - U_{CE}(Q3)}{R6 + R2} + U_{CE}(Q3) \quad (42)$$

$$Uy = \frac{R2}{R6 + R2} \cdot Uz - \left(\frac{R2}{R6 + R2} - 1\right) \cdot U_{CE}(Q3) \quad (43)$$

$$Uy = \frac{R2}{R6 + R2} \cdot Uz + \left(1 - \frac{R2}{R6 + R2}\right) \cdot U_{EB}(Q3) \cdot \left(\frac{RCB}{RBE} + 1\right) \quad (44)$$

From the condition Rf>>R2+RBE+RCB, it furthermore follows that Uc≈TV*Uy. From this, taking into account equation (44), it follows for the load voltage Umot that:

$$Umot = \quad (45)$$
$$\left\{TV \cdot \left[\frac{R2}{R6+R2} \cdot Uz + \left(1 - \frac{R2}{R6+R2}\right) \cdot U_{EB}(Q3) \cdot \left(\frac{RCB}{RBE} + 1\right)\right] - U_{EB}(Q4)\right\} \cdot \left(\frac{R4}{R3} + 1\right) - Ugs \cdot \frac{R4}{R5}$$

This equation for the load voltage Umot becomes independent of the emitter-base voltage $U_{EB}(Q4)$ of the transistor Q4 when the following relation is satisfied:

$$TV \cdot \left(1 - \frac{R2}{R6 + R2}\right) \cdot \left(\frac{RCB}{RBE} + 1\right) = 1 \quad (46)$$

If the resistors RCB, RBE, R2, R6 of the PWM/DC converter 4d are selected in accordance with the above relation, then the influence of the emitter-base voltage UEB of the transistor Q4 on the load voltage Umot is compensated, provided that a double transistor is used, i.e. provided that $U_{EB}(Q3)=U_{EB}(Q4)$. The control system 3d can in this case be of such dimensions that in the range around a certain pulse duty cycle TV, for example, around TV=0.5, there is a tolerable distribution of the load voltage Umot as a function of a distribution of the emitter-base voltages $U_{EB}(Q3)$, $U_{EB}(Q4)$ of the two transistors Q3, Q4.

With all the control systems 1a, 2, 3a-d shown in FIGS. 2 to 5, it is possible to provide additionally subordinate circuit parts, which are arranged in the collector circuit of the transistor Q4 and are fed by the collector current thereof, so that a quiescent current switch-off is rendered possible also for the subordinate circuit part. It is a further especially advantageous feature of the above described control systems that these can be constructed with comparatively few discrete components and consequently can be produced especially inexpensively, and they remain functional over a wide temperature range up to +150° C.

Figure 5:
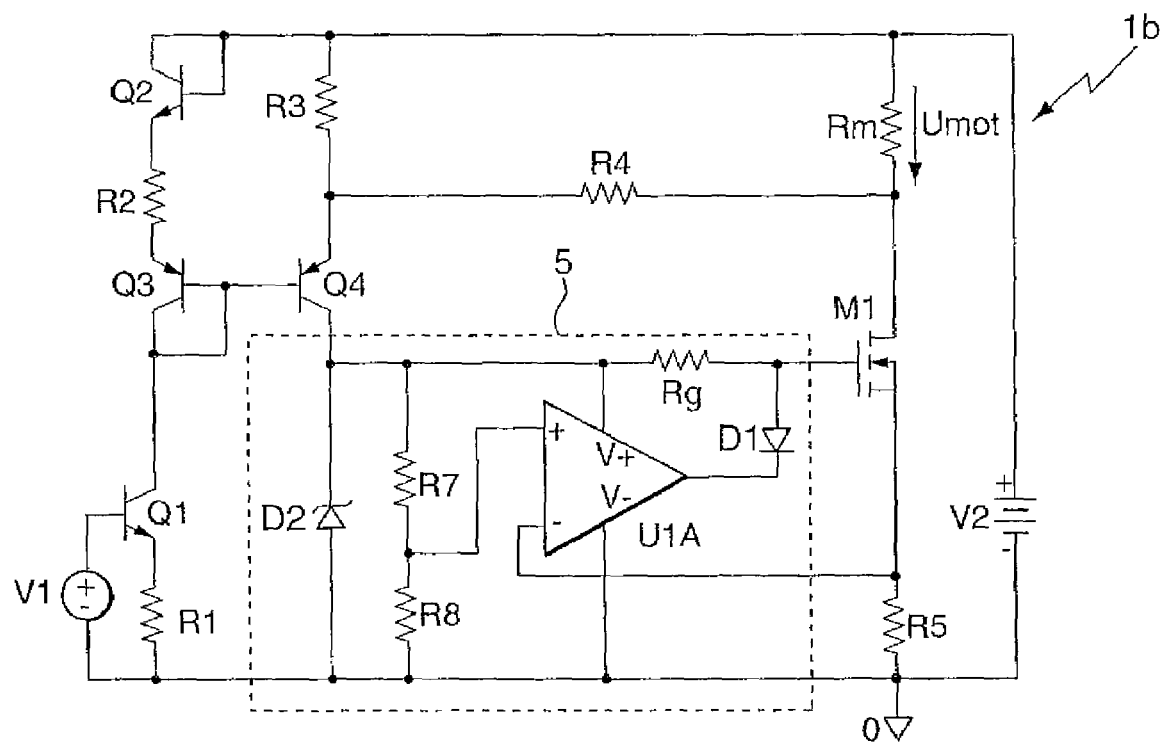
FIG. 5 is a circuit diagram of the embodiment of FIG. 2 with a current limiter as the additional subordinate circuit part.

FIG. 5 shows a control system 1b that corresponds to the control system 1a of FIG. 1 and is supplemented by a current limiter as the subordinate circuit part 5, which provides short-circuit protection and overload protection. The subordinate circuit part 5 is in this case arranged parallel to the gate-source control path of the setting transistor M1 in the form of a MOS-FET.

The mode of operation of the current limiter is as follows: an operational amplifier U1A compares the voltage drop across an eighth resistor R8 with the voltage drop across the fifth resistor R5 (shunt resistor). In the event of a short circuit, the voltage drop across the fifth resistor R5 increases above the voltage drop across the eighth resistor R8, the operational amplifier U1A reduces its output voltage and via a diode D1 limits the gate voltage of the setting transistor M1. The arrangement is furthermore short-circuit-proof, since a Zener diode D2 is used as reference value for the short-circuit current and at the same time limits the gate voltage across the setting transistor M1. The voltage divider between a seventh resistor R7 and the eighth resistor R8 in this case reduces the voltage drop across the Zener diode D2 to a suitable value.

The above described control systems 1a, 1b, 2, 3a to 3d manage with a very small number of components and can be discretely embodied even without integrated components. Discrete circuits operate up to 150° C. ambient temperature, expensive integrated circuits only up to 125° C. Using the inventive circuit concept it is therefore possible, for example, to construct an inexpensive control system which is cooled by means of the cooling water of the combustion engine in the motor vehicle. The control systems are therefore suitable in particular for motor vehicle fans, in which a fan motor constitutes the load.

Furthermore, the above-described control systems have a quiescent current consumption that is clearly below the quiescent current consumption of the control systems known from the prior art. The resistors in the above-described solutions can also be of lower impedance dimensions and the circuits can therefore be made less susceptible to leakage currents. Thus, for example, the third and fourth resistors R3, R4 can each amount to less than 10 kΩ, preferably less than 2 kΩ. The above solutions also employ a control system having comparatively low loop gain, which has a positive effect on the EMC performance and on expenditure for interference suppression measures. The response of the control properties of the described control systems in the event of fluctuations in the on-board or supply voltage V2 is furthermore also largely independent of component tolerances.

What is claimed is:

1. Electronic control system for controlling a voltage across a load, in particular across a fan motor of a motor vehicle, as a function of a control signal, comprising:
   a setting transistor,
   a transistor, which activates the control channel of the setting transistor,
   two resistors, which form a voltage divider via which the voltage across the load is fed to an emitter of the transistor,
   wherein the control system is designed, in the absence of the control voltage signal, to block the control channels of all the transistors of the control system for limiting the current through all the resistors of the control system, such that, in the absence of the control voltage signal, the control system has a low current consumption in the off-state current range of the transistors.

2. Control system according to claim 1, wherein the two resistors each amount to not more than 10 kΩ.

3. Control system according to claim 1 wherein the two resistors each amount to not more than 2 kΩ.

4. Control system according to claim 1, which is designed to generate a voltage across the load proportional to the control voltage signal, the proportionality factor being dependent on the ratio of the two resistors.

5. Control system according to claim 1, wherein an emitter-base voltage of a further transistor compensates for the influence of an emitter-base voltage of the transistor on the voltage across the load.

6. Control system according to claim 5, wherein the further transistor, together with the transistor, forms a base-coupled differential amplifier, the transistors of the differential amplifier preferably forming a double transistor.

7. Control system according to claim 6, wherein the control voltage signal is a control voltage and in which two additional transistors are provided, the control voltage being fed to the control channel of the first additional transistor, and the second additional transistor, together with the further transistor of the differential amplifier, being arranged in the collector circuit of the first additional transistor.

8. Control system according to claim 7, wherein a first resistor in the emitter circuit of the first additional transistor and a second resistor in the collector circuit of the first additional transistor are arranged in series with the second additional transistor, the first and second resistors preferably being of the same size.

9. Control system according to claim 6, wherein the control voltage signal is a control current, and in which two additional transistors are provided, which form a current mirror for transfer of the control current to the further transistor.

10. Control system according to claim 6, wherein the two additional transistors form a double transistor.

11. Control system according to claim 1, wherein the control voltage signal is a pulse width-modulated signal and the control system comprises a PWM/DC converter for converting the pulse width-modulated signal into a direct voltage.

12. Control system according to claim 11, wherein the PWM/DC converter comprises a further transistor, which preferably forms a double transistor with the transistor, the emitter-base voltage of the further transistor exactly compensating for the influence of the emitter-base voltage of the transistor on the voltage across the load at exactly one pulse duty cycle.

13. Control system according to claim 12, wherein a base-emitter resistor is arranged parallel to the base-emitter path of the further transistor and a collector-base resistor is arranged parallel to the collector-base path of the further transistor, the exactly one pulse duty cycle being adjustable by way of the ratio of the two resistors.

14. Control system according to claim 1, further comprising a subordinate circuit part, in particular a current limiter, which is arranged in the collector circuit of the transistor and which is fed by the collector current thereof.

15. Control system according to claim 14, wherein the subordinate circuit part is arranged parallel to the gate-source control path of the setting transistor in the form of a MOSFET.

16. Control system according to claim 1, wherein the system is constructed from discrete components.

17. Motor vehicle fan having a control system according to claim 1, wherein a fan motor constitutes the load.

* * * * *